UNITED STATES PATENT OFFICE.

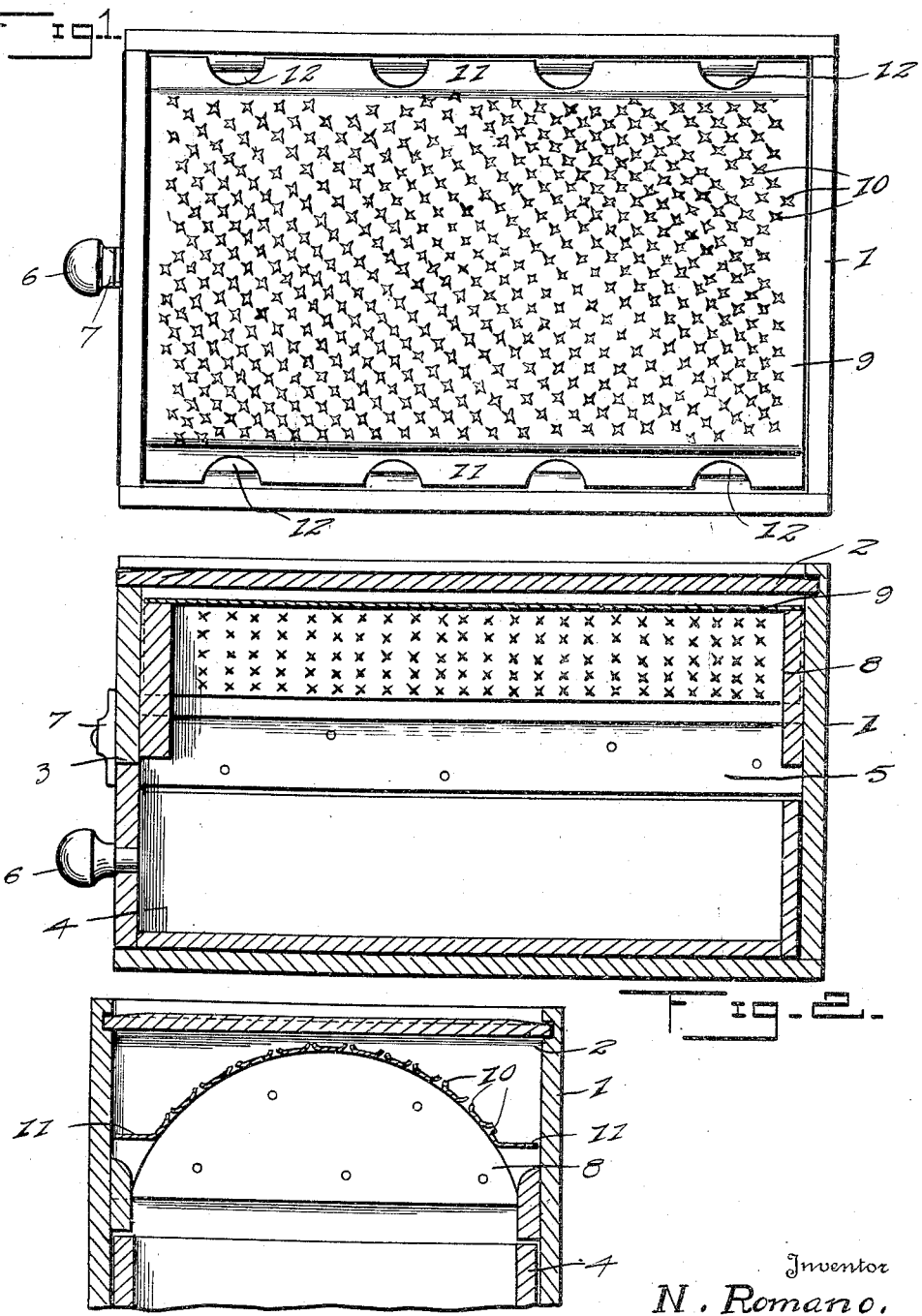

NICHLAS ROMANO, OF BRATTLEBORO, VERMONT.

CABINET-GRATER.

1,206,596.

Specification of Letters Patent. Patented Nov. 28, 1916.

Application filed May 12, 1916. Serial No. 97,087.

*To all whom it may concern:*

Be it known that I, NICHLAS ROMANO, a subject of the King of Italy, residing at Brattleboro, in the county of Windham and State of Vermont, have invented certain new and useful Improvements in Cabinet-Graters; and I do hereby declare the following to be a full, clear, and exact description of the invention, such as will enable others skilled in the art to which it appertains to make and use the same.

This invention relates to new and useful improvements in a cabinet grater and one of its objects is the provision of a device of this character, which shall be simple, durable and efficient, and which may be manufactured and sold at a comparatively low cost.

Another object of this invention is to provide a casing, having a grater therein and a drawer thereunder, whereby the grated material may be collected and removed from the casing.

A further object of this invention is to provide a novel means of supporting the grater within the casing and which is provided with retaining flanges, having openings therein, for allowing the grated materials which fall from the sides of the grater to pass into the drawer.

A still further object of this invention is to provide a removable top which entirely incloses the casing and prevents dirt and other foreign matter from entering the casing when not in use and which will also keep the grated materials sanitary if they are kept from time to time within the casing after they have been grated.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing. in which:—

Figure 1 is a top plan view of a cabinet grater, with the top removed, constructed in accordance with my invention, Fig. 2 is a vertical longitudinal sectional view, illustrating the means of supporting the grater within the casing, and Fig. 3 is a fragmentary transverse sectional view illustrating the containing flanges of the grater.

Referring in detail to the drawing, the numeral 1 indicates a casing having the side and rear walls provided with grooves to form guide ways for a removable top 2. The front wall of the casing 1 is provided with a doorway 3 for allowing a drawer 4 to be slid within the casing and has its upper edges engaged by side strips 5 preventing the drawer from working upwardly and downwardly within the casing. A suitable handle 6 is secured to the drawer 4 for inserting and withdrawing the drawer from the casing when desired. A suitable catch 7 is pivotally secured to the front wall of the casing and adjacent the doorway 3 providing means for holding the drawer 4 with in the casing 1.

Substantially semicircular blocks 8 are secured to the front and rear walls of the casing above the guide strips 5 for supporting a grater 9 within the casing and directly over the drawer 4. The grater 9 is constructed from metal or other suitable material and is provided with a plurality of struck up portions 10 to bite or cut into materials when they are rubbed upon the grater. The grater 9 is substantially semicircular in cross section and rests upon the substantially semicircular blocks 8 and are provided with retaining flanges 11 upon each side thereof which is provided with substantially semicircular openings 12 for allowing the grated materials to pass into the drawer 4 and fall downwardly upon the outside of the grater. The grater 9 is riveted or otherwise secured to the block 8 for holding said grater against displacement in the casing.

In operation, the removable top 2 is removed from the casing and the materials are rubbed upon the grater 9 and the particles therefrom pass through the openings in the grater caused by the struck up portions 10 and also through the opening 12 in the retaining flanges 11, passing into the drawer 4. The operator then may remove the drawer 4 from the casing and remove the grated material therefrom as desired. After the materials have been grated, the top 2 may be replaced upon the casing which will prevent dirt and other foreign matter from entering within the casing and into the grated materials within the drawer 4, thus keeping the grated materials sanitary.

While I have shown and described the preferred embodiment of my invention, it will be understood that minor changes in construction, combination and arrangement of parts may be made without departing from the spirit and scope of the invention as claimed.

Having thus described my invention, what I claim is:—

1. A cabinet grater comprising a casing, substantially semicircular blocks secured within the casing and adjacent the top thereof, a grater secured to said blocks, and means slidably mounted within the casing for collecting grated materials from the grater.

2. A cabinet grater comprising a casing, a removable cover secured to said casing, substantially semicircular blocks secured to the front and rear walls of the casing and adjacent the top, a grater secured to the blocks, flanges formed on the sides of the grater and provided with openings therein, and means slidably mounted within the casing and positioned below the grater for collecting the grated materials from the grater.

In testimony whereof I affix my signature in presence of two witnesses.

NICHLAS ROMANO.

Witnesses:
 HORTON D. WALKER,
 CARL S. HOPKINS.

Copies of this patent may be obtained for five cents each, by addressing the "Commissioner of Patents, Washington, D. C."